(12) United States Patent
Khan et al.

(10) Patent No.: US 6,427,175 B1
(45) Date of Patent: Jul. 30, 2002

(54) METHOD AND APPARATUS FOR COLLABORATIVE REMOTE LINK MANAGEMENT USING SHARABLE ONLINE BOOKMARKS

(75) Inventors: Umair Khan; Rizwan Tufail, both of Fremont; Christine Odero, Santa Clara, all of CA (US)

(73) Assignee: Clickmarks, Inc, Fremont, CA (US)

( * ) Notice: Subject to any disclaimer, the term of this patent is extended or adjusted under 35 U.S.C. 154(b) by 0 days.

(21) Appl. No.: 09/405,533

(22) Filed: Sep. 24, 1999

(51) Int. Cl.⁷ .............................................. C06F 17/30
(52) U.S. Cl. ....................... 709/245; 709/229
(58) Field of Search ........................... 345/335; 707/10, 707/203, 516, 501; 709/205, 234, 245, 229

(56) References Cited

U.S. PATENT DOCUMENTS

| | | | |
|---|---|---|---|
| 5,813,007 A | * 9/1998 | Nielsen | 707/10 |
| 5,974,427 A | * 10/1999 | Reiter | 707/203 |
| 6,032,162 A | * 2/2000 | Burke | 707/501 |
| 6,037,934 A | * 3/2000 | Himmel et al. | 345/335 |
| 6,041,360 A | * 3/2000 | Himmel et al. | 709/245 |
| 6,049,812 A | * 4/2000 | Bertram et al. | 707/516 |
| 6,105,028 A | * 8/2000 | Sullivan et al. | 707/10 |
| 6,112,228 A | * 8/2000 | Earl et al. | 709/205 |
| 6,212,522 B1 | * 4/2001 | Himmel et al. | 707/10 |
| 6,240,455 B1 | * 5/2001 | Kamasaka et al. | 709/229 |

OTHER PUBLICATIONS

From Bookmark Managers to Distributed Indexing: An Evolutionary Way to the Next Generation of Search Engines by Arkadi Kosmynin; IEEE Communications Magazine, Jun. 1997.*

* cited by examiner

*Primary Examiner*—N. Le
*Assistant Examiner*—Walter Benson
(74) *Attorney, Agent, or Firm*—Silicon Valley IP Group; Dominic M. Kotab

(57) ABSTRACT

A method of sharing access operations of at least one bookmark node with an associated access level for each access operations by at least two identified web users. The method includes steps of allowing performance and barring performance of the access operation by an identified web user of the bookmark node. The access operations including viewing and editing the bookmark node by an identified web user. Whenever the associated access level of a first access operation allows an identified web user to perform the access operation upon the bookmark node, the first access operation of first bookmark node by first identified web user is allowed. Whenever the associated access level of the access operation bars the identified web user from performing the first access operation upon the first bookmark node the performance is barred. Other embodiments of the invention are computer programs on computer readable media. Still other embodiments are servers providing the software and maintaining bookmark folders with access privileges for identified web users.

36 Claims, 11 Drawing Sheets

METHOD AND APPARATUS FOR COLLABORATIVE REMOTE LINK MANAGEMENT USING SHARABLE ONLINE BOOKMARKS

BACKGROUND OF THE INVENTION

This invention relates to sharing online access privileges to a group of bookmarks by more than one user, and the maintenance of the bookmarks in a seamless fashion while users surf the web.

FIG. 1 portrays a prior art computer. Hardware enclosure 2 houses a display device 10. Hardware enclosure 4 houses the interfaces to the keyboard 20 and its communications physical transport 22, selector device 30 and its communication physical transport 32, a removable media site 40 and an external communications physical transport 50.

Note that in certain prior art computer systems, there is no keyboard 20. Computer systems without keyboards 20 include but are not limited to some entertainment systems, some hand held computers and some information kiosks. Note that in some prior art computer systems, there may be no support for removable media site 40. Computer systems without removable media site 40 include but are not limited to some desktop personal computers, some entertainment systems, some handheld computers and some information kiosks.

Note that in some prior art computer systems, enclosures 2 and 4 are integrated into a single mechanical component. This is most commonly seen in certain handheld computers. In certain other prior art computer systems, enclosures 2 and 4 are mechanical connected components, as in certain notebook computers. In certain prior art computer systems, there are additional enclosures. This is commonly seen with audio devices, such as speakers and microphones in some desktop computers.

FIG. 2 portrays a block diagram of a prior art computer as shown in FIG. 1. Display device 10 communicates upon display device transport mechanism 12 to display interface 14, which in turn communicates on transfer channel 16 to digital controller 70. Keyboard device 20 communicates upon keyboard device transport mechanism 22 to keyboard interface 24, which in turn communicates on transfer channel 26 to digital controller 70. Selector device 30 communicates upon selector device transport mechanism 32 to selector interface 34, which in turn communicates on transfer channel 36 to digital controller 70. Removable storage device 40 communicates upon removable storage device transport mechanism 42 to removable storage interface 44, which in turn communicates on transfer channel 46 to digital controller 70. External communication 50 communicates upon external communication transport mechanism 52 to display interface 54, which in turn communicates on transfer channel 56 to digital controller 70. Local mass storage device 60 communicates upon local mass storage device transport mechanism 62 to local mass storage interface 64, which in turn communicates on transfer channel 66 to digital controller 70.

Display device 10 includes but is not limited to flat panel displays as well as CRT displays. Note that in certain prior art computers, there may be more than one display device 10, possibly sharing a display device physical transport mechanism 12, display interface 14, or transfer channel 16.

Prior art selector device 30 includes but is not limited to mouse devices, trackball devices, pen tablet devices and pressure sensitive touch devices. Prior art mouse devices include but are not limited to wireline and wireless mouse devices capable of moving in two-dimensions and three-dimensions, possessing at least one button, including multimedia wireless control interfaces with many buttons and built-in system response indicators. Wireless selector transport mechanisms include but are no limited to acoustic, infra-red, radio frequency electromagnetic and optical physical transport layers. Prior art pen tablet devices include but are not limited to pen tablets which are integrated with the display device as well as pen tablets which are discerned separately by users. Prior art pressure sensitive touch devices include but are not limited to mouse "sticks", touch pads, touch sensitive display device screens. Prior art mouse "sticks" are sometimes found integrated into the keyboard 20. Prior art touch pads are sometimes found integrated into the keyboard 20 and sometimes discernibly separated from the keyboard 20. Prior art touch sensitive display device screens integrate the pressure sensitive touch surface 30 with the display device 10.

Removable storage device 40 communicates via removable storage device transport mechanism 42 with removable storage interface 44, which in turn communicates on transfer channel 46 with digital controller 70. Removable storage device 40 includes but is not limited to removable optical disks, removable electromagnetic disks and removable electromagnetic tapes. Removable optical disks include but are not limited to CD-ROMs, CD-R disks, CD-RW disks, DVD-ROMs and DVD-RAM disks. Removable electromagnetic disks include but are not limited to floppy disks of various memory capacities in various formats, as well as higher density rigid disks. Removable electromagnetic tapes include but are not limited to cassettes and cartridges in a variety of formats including but not limited to DAT with a variety of memory capacities.

External communication physical transport 50 communicates via external communication delivery component 52 with external communication interface 54, which in turn communicates on transfer channel 56 with digital controller 70. External communication physical transport 50 includes but is not limited to wireline and wireless physical transport layers. External communication physical transport 50 wireline layers include but are not limited to wire and optical fiber transport mechanisms. Communication delivery component 52 for such prior art wireline transport mechanisms include but are not limited to electromechanical couplers, opto-mechanical couplers, opto-electrical interfaces and mechanical connectors incorporating opto-electrical interfaces. External communication interfaces 54 include but are not limited to various kinds of modems. External communication physical transport 50 wireless layers include but are not limited to electromagnetic, infra-red and optical wireless transport mechanisms. Communication delivery component 52 for such prior art wireless transport mechanisms include but are not limited to radio antennas and antenna arrays, opto-electrical transceiver interfaces, infra-red transceiver interfaces. External communication interfaces 54 include but are not limited to various kinds of modems.

Local mass storage device 60 communicates via local mass storage device transport mechanism 62 with local mass storage interface 64, which in turn communicates on transfer channel 66 with digital controller 70. Local mass storage 60 includes but is not limited to one or more electromagnetic disks and/or one or more optical disks. Local mass storage 60 includes mass storage capable of being both read and written. Local mass storage 60 may also include but is not limited to read-only disks, as well as disks which may be written once and read repeatedly.

Transfer channels 16, 26, 36, 46, 56 and 66 in certain systems may represent distinct signal paths directly interfaced to digital controller 70. In prior art certain systems, one or more of these transfer channels may be grouped into shared computer busses. By way of example, in certain systems, the display device transfer channel 16 and local mass storage transfer channel 66 may be a separate shared computer bus. In certain systems, the removable storage transfer path 46 and local mass storage transfer channel 66 may be a separate shared computer bus. In certain systems, the keyboard transfer path 26 and selector device transfer channel 36 may be a separate shared computer bus, such as USB.

Prior art digital controllers 70 often incorporate RAM as well as a digital microprocessor. Prior art digital controllers 70 often further incorporate non-volatile memory.

Relevant prior art computers are connected into networks. Within such networks, prior art computers are often designated as clients interacting with other computers known as servers. Note that a server may act as a client in relationship with another server. For example, a server may be a client of an internet domain name server. Client prior art computers are characterized as being smaller computers than servers. Servers often possess very high bandwidth external communications interfaces with very large local mass storage. A client computer may have a telephone line or T1 ethernet link to a network, whereas servers usually start with one or more T1 links, and can be found servicing gigabit ethernet external communications protocols.

Most websites are situated on servers. The core content of most small to mid-size "jump-station" sites is a set of links related to the site's theme: e.g., a site focussing on East European political news may consist largely of links to east European news sites). Similarly most personal homepages at web communities (e.g., Geocities, Xoom, AngelFire, etc.) are basically a set of links to the individual's favorite web sites. Maintaining these sites requires adding new links regularly: webmasters, homepage owners must login or Telnet/ftp to the site to add/edit links. Being volunteers and part timers, they usually cannot dedicate a lot of time thus updating their webpage(s).

What tends to happen with personal homepages is that the owner stops updating this set of favorite links, the homepage goes stale and visitors have little reason to return to this page. Similarly in the case of small jumpstation websites, updates by the webmaster(s) often become sporadic, lessening the value to visitors.

There are many link managers available for webmasters, several of them are available as shareware downloads. However all require the webmaster to access their link site to add/edit/maintain bookmarks. The overhead of an initial elaborate setup of the links manager and of continually accessing the link site to add a new site to the bookmark link set displayed on the website is an inconvenience for the part-timers and volunteers who usually maintain such sites.

At present bookmark sets are private collections on a user's computer with "Read" and "Write" privileges belonging to the owner. They are usually arranged as a set of links categorized within several folders and sub folders. Only one user, the owner, may view them, edit them or add links to them.

SUMMARY OF THE INVENTION

A method of sharing access operations of at least one bookmark node with an associated access level for each access operations by at least two identified web users. The method includes steps of allowing performance and barring performance of the access operation by an identified web user of the bookmark node. The access operations including viewing and editing the bookmark node by an identified web user. Whenever the associated access level of a first access operation allows an identified web user to perform the access operation upon the bookmark node, the first access operation of first bookmark node by first identified web user is allowed. Whenever the associated access level of the access operation bars the identified web user from performing the first access operation upon the first bookmark node the performance is barred.

Embodiments of this invention include a method providing an advantageous manner for maintaining a jumpstation website collaboratively. In certain embodiments, one or more webmasters, possibly with group access privileges may collaboratively modify the jumpstation website. In certain embodiments, public users may view the bookmarked links.

Certain further embodiments support remote management of online bookmarks. A bookmark account with an owner and online bookmark folder resides on a server. Initializing the account includes downloading a reporting mechanism. The owner triggers the reporting mechanism while using their local web-browser to add a website address link to their online bookmark folder. The reporting mechanism calls the server with the website address link. These embodiments advantageously reduce the maintenance overhead and time requirements for jumpstation sites and personal sites.

Embodiments of the invention also include a computer program embodied on a computer readable medium for sharing access operations including viewing and editing of at least one bookmark node with an associated access level for each of the access operations by at least two identified web users. The computer program includes code allowing the access operation performance and code barring the access operation performance. The code allowing performance a first access operations of a first bookmark nodes by a first identified web user is executed whenever the associated access level of the first access operation allows the identified web user to perform the first access operation upon the first bookmark node. The code barring performance of the first access operation of the first bookmark node by the first identified web user is executed whenever the associated access level of the first access operation bars the identified web user from performing the first access operation upon the first bookmark node.

Embodiments of this invention as computer programs provide an advantageous manner for maintaining a jumpstation website collaboratively. In certain embodiments of these computer programs, one or more webmasters, possibly with group access privileges may collaboratively modify the jumpstation website. In certain embodiments, public users may view the bookmarked links.

Certain further computer program embodiments support remote management of online bookmarks. A bookmark account with an owner and online bookmark folder resides on a server. The code initializing the account includes code for downloading a reporting mechanism. The owner triggers the reporting mechanism while using their local web-browser to add a website address link to their online bookmark folder. The reporting mechanism calls the server program with the website address link. These embodiments advantageously reduce the maintenance overhead and time requirements for jump-station sites and personal sites.

Embodiments of the invention further include a computer network for sharing access operations of at least one bookmark node with an associated access level for each access operation by at least two identified web users including at least one server. The server is coupled via the computer network with at least one client computer operated by the identified web users. The shared access operations include viewing and editing of at least one bookmark node with an associated access level for each of the access operations by identified web users. The server contains a computer program for sharing the access operations of bookmark nodes with associated access level for each access operations by identified web users initiated by access operation requests by the identified web users. The server allows the access operation performance of a bookmark node by an identified web user whenever the associated access operation access level allows the identified web user to perform the access operation upon the bookmark node. The server bars access operation performance of the bookmark node by the identified web user whenever the associated access operation access level bars the identified web user from performing the access operation upon the bookmark node.

Embodiments of this invention including networks with a server resident computer program provide an advantageous manner for maintaining a jumpstation website collaboratively. In certain embodiments, one or more webmasters, possibly with group access privileges may collaboratively modify the jumpstation website. In certain embodiments, public users may view the bookmarked links.

Certain further embodiments support remote management of online bookmarks. A bookmark account with an owner and online bookmark folder resides on a server. Initializing the account includes downloading a reporting mechanism. The owner triggers the reporting mechanism while using their local web-browser to add a website address link to their online bookmark folder. The reporting mechanism calls the server with the website address link. These embodiments advantageously reduce the maintenance overhead and time requirements for jump-station sites and personal sites.

These and other advantages of the present invention will become apparent upon reading the following detailed descriptions and studying the various figures of the drawings.

DESCRIPTION OF PREFERRED EMBODIMENTS

Figure 1:
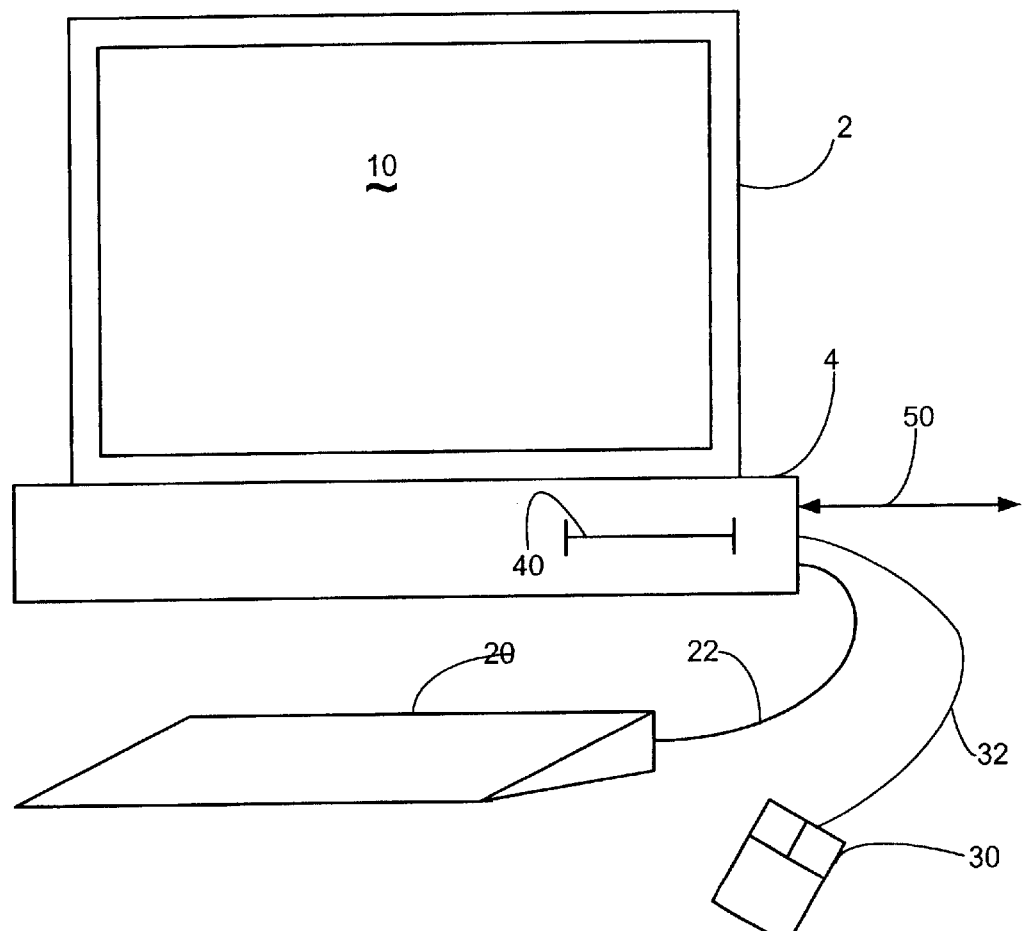
FIG. 1 portrays a prior art computer.
Figure 2:
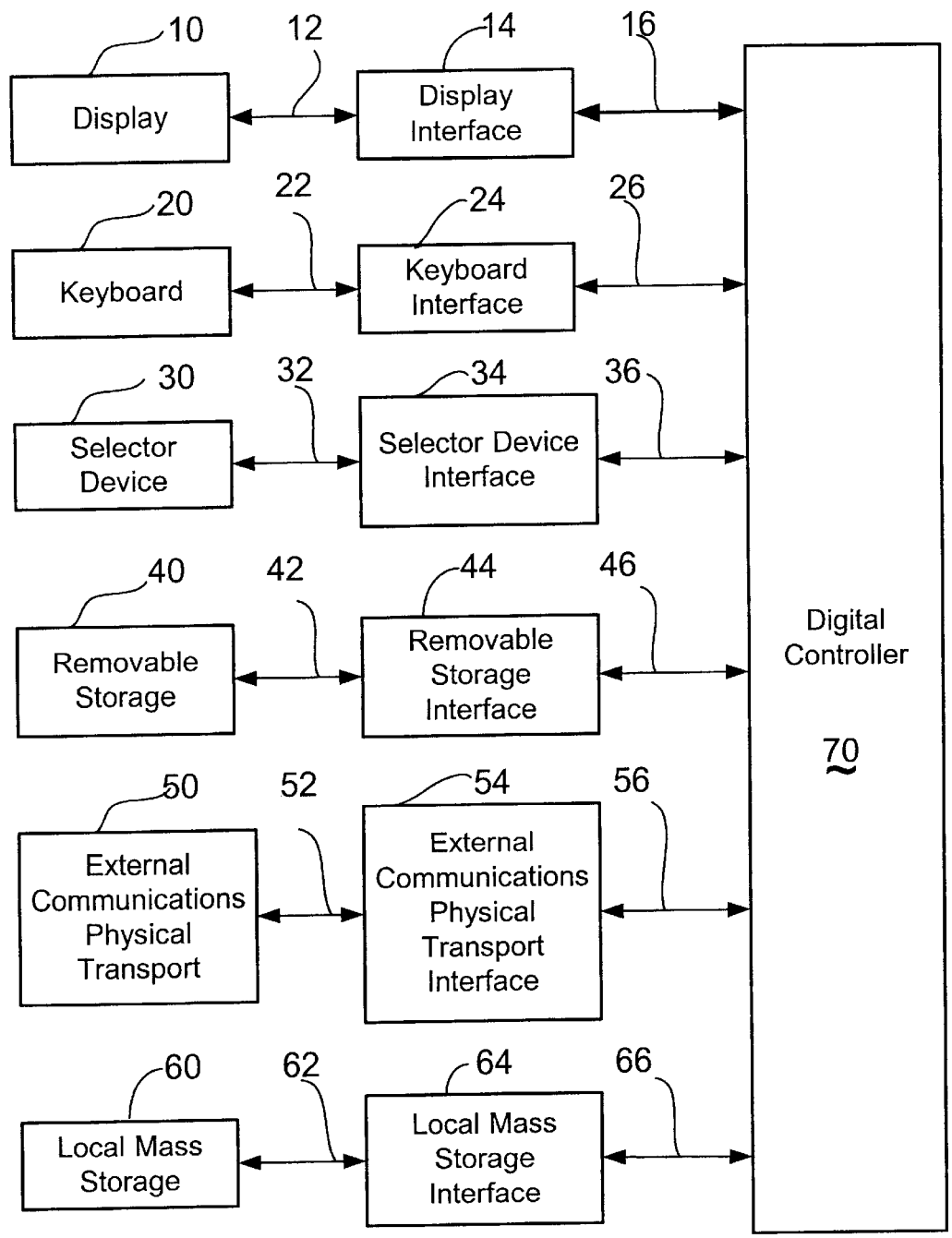
FIG. 2 portrays a block diagram of a prior art computer as shown in FIG. 1.

FIGS. 1 and 2 have been previously discussed in the background of the invention.

Figure 3:
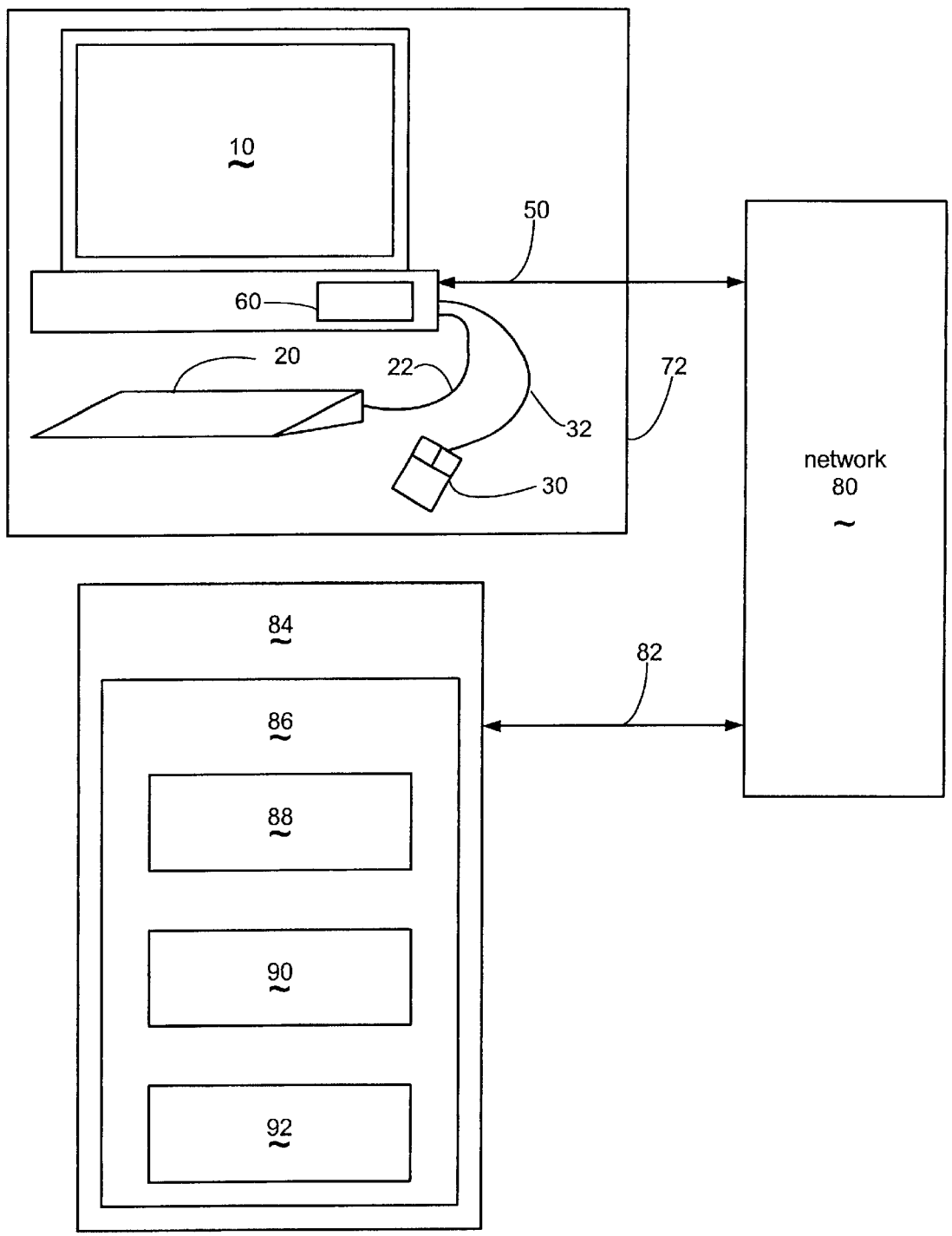
FIG. 3 is a system block diagram in accordance with an embodiment.

FIG. 3 is a system block diagram in accordance with an embodiment. The upper left hand corner of this diagram depicts a client computer 72 showing a display device 10, keyboard 20 with keyboard physical transport 22, selector device 30 with selector device physical transport 32, external communication physical transport 50 and local mass storage 60. Note that this diagram has been provided by way of illustration, multiple client computers may be coupled in an actual system embodying this invention. The client computer 72 is coupled to a network 80 by its external communication physical transport 50. The network is further coupled by arrow 82 to server 84, which is similar in block diagram structure to the prior art computers discussed regarding FIGS. 1 and 2. Most importantly for this invention, server 84 local mass storage 86 further contains programs 88 and user account information 90 and a collection of bookmark nodes 92.

Bookmark nodes as used herein refer to bookmark links as well as folders for bookmark links and sub-folders of bookmark folders.

Certain embodiments include group sharable online bookmarks 92 on a server 84. Such embodiments provide an innovative method of maintaining a jumpstation website collaboratively. Further embodiments include remote management of bookmarks 92 online, leading to an innovative solution reducing the maintenance overhead and time requirements for jump-station sites and personal sites.

Certain embodiments include group sharable online bookmarks 92. Keeping bookmarks online opens up the opportunity of sharing bookmarks with others. The concept of Group Sharable Bookmarks (GSB) allows any bookmark node (folder or link) in a bookmark set 92 to be associated with private, group, or public access levels. At each access level, both viewing and editing privileges may be given. Thus one folder may be publicly viewable but privately editable, another may be viewable and editable publicly, still another may be a private link which no one else can see or edit.

Publicly viewable bookmarks can be made into the basis of any jumpstation website or personal webpage (whose core content is simply a set of relevant links). The concept of different privilege/access levels can be applied to collaboratively maintain these links and hence the website. Instead of a single webmaster, one or more groups of webmasters and indeed any of the viewing public can add to the links on the website.

Certain embodiments include remote management of online bookmarks 92 residing on a server 84 by identified web users on client computers 72. Using group sharable online bookmarks sets up an innovative method of maintaining a jumpstation website collaboratively.

The question remains: How to maintain the links remotely, i.e. without logging into the site each time a link needs to be added. The answer comes from the ability to add links remotely to an online bookmarks account. The owner (s) of the online bookmark account is setup with a mechanism allowing them to, while surfing the web, add any site they visit, directly to the bookmarks account.

In one embodiment, a special bookmark is setup in the user's local (browser-based) bookmarks on a client computer 72 residing in local mass storage 60. This special bookmark is in fact not the URL of a website but a call to the server 84 which houses the users online bookmarks 92. When the user arrives at a website he would like to add to his bookmarks account, he simply selects the special bookmark in his local browser on client computer 72. This bookmark calls the server 84 with the location (URL) of the website currently being visited. The URL then gets added to the online bookmarks account 90 and folder 92.

Another embodiment entails a small utility, which is downloaded from the server 84 program store 88 to the user's client computer 72 local mass storage 60. Whilst surfing the web, clicking on the icon shown in display 20 for this utility would look up the user's browser's history buffer and determine which website the user is currently visiting. It would then generate a call to the server 84 hosting the users bookmarks account 90 with the URL of the currently accessed website. This website would then get added to the online bookmarks set 92.

Note that in either embodiment, the user does not have to log in to the online bookmarks account 90 to actually add a new bookmark. Applying these two concepts together (group sharable online bookmarks and adding new links remotely to online bookmarks), provides a method for collaborative remote management of links on a public website.

Certain embodiments include personal homepages: Web communities that host personal homepages can offer online bookmarks to their users whereby anyone taking a homepage at the community site will automatically get an online bookmarks account 90. The bookmarks 92 in that account will also be displayed on the user's homepage. Now adding links to a homepage will be as simple as the user surfing to a site and remotely adding it to their bookmarks account 90 and bookmark set 92, simultaneously updating their personal homepage as well! Now maintaining their homepage does not require them to spend time to login or access via ftp/telnet anymore.

Certain embodiments include "Jump-station" web pages: The web-based group sharable bookmark paradigm provides the solution for jumpstation webmaster(s) as well. Webmasters of such jump-station sites will take a Group Sharable Bookmarks account 90 online whose content (bookmarks) 92 will be displayable on their web site. Then the webmaster (s) can, while surfing the web, discover a relevant site and remotely adding it to the bookmarks account 90, simultaneously updating their website: No need at all to login or access their website directly via ftp or telnet. Not only may the webmaster(s) remotely and collaboratively add bookmarks 92 to maintain the site, but with the flexibility of six privilege levels per folder or URL (Group sharable bookmarks), any Internet user can help update the site whilst surfing the web, without even accessing the jumpstation website directly.

Figure 4:
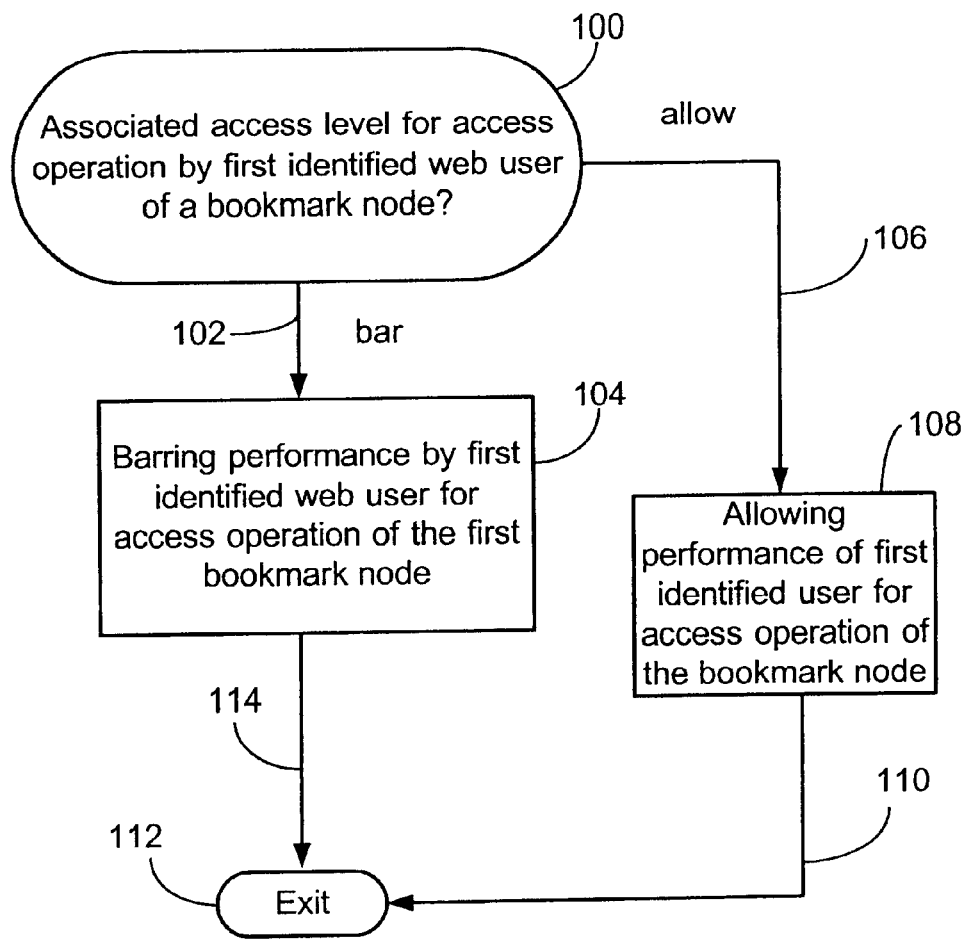
FIG. 4 is a flowchart of the basic access mechanism for shared bookmark links in accordance with an embodiment.

FIG. 4 is a flowchart of the basic access mechanism 100 for shared bookmark links in accordance with an embodiment. An identified web user requests an access operation of a bookmark node on a server. The server, at operation 100 determines the associated access level for the access operation by the identified web user of the bookmark node. If barred, arrow 102 designates the flow of execution from operation 100 to operation 104. If allowed, arrow 106 designates the flow of execution from operation 100 to operation 108.

Operation 104 bars performance the access operation by the identified web user of the bookmark node. Arrow 114 designates the flow of execution from operation 108 to operation 112. Operation 108 allows performance the access operation by the identified web user of the bookmark node. Arrow 110 designates the flow of execution from operation 108 to operation 112.

In certain embodiments, access operations include the viewing and the editing of bookmark nodes. In certain further embodiments, access operations further include adding bookmark nodes to a bookmark link folder. In certain embodiments, edit access privilege automatic provides viewing access privileges for a bookmark node.

In certain embodiments, owner identified web users have viewing and editing access privileges within a first bookmark folder created for them with the initialization of their online account on the server. In certain further embodiments, identified user groups may be further included, where the access privileges of a member of the identified user group are those of the user group. In certain other embodiments, identified web users may all be classed as public users and possess some access privileges.

Figure 5:
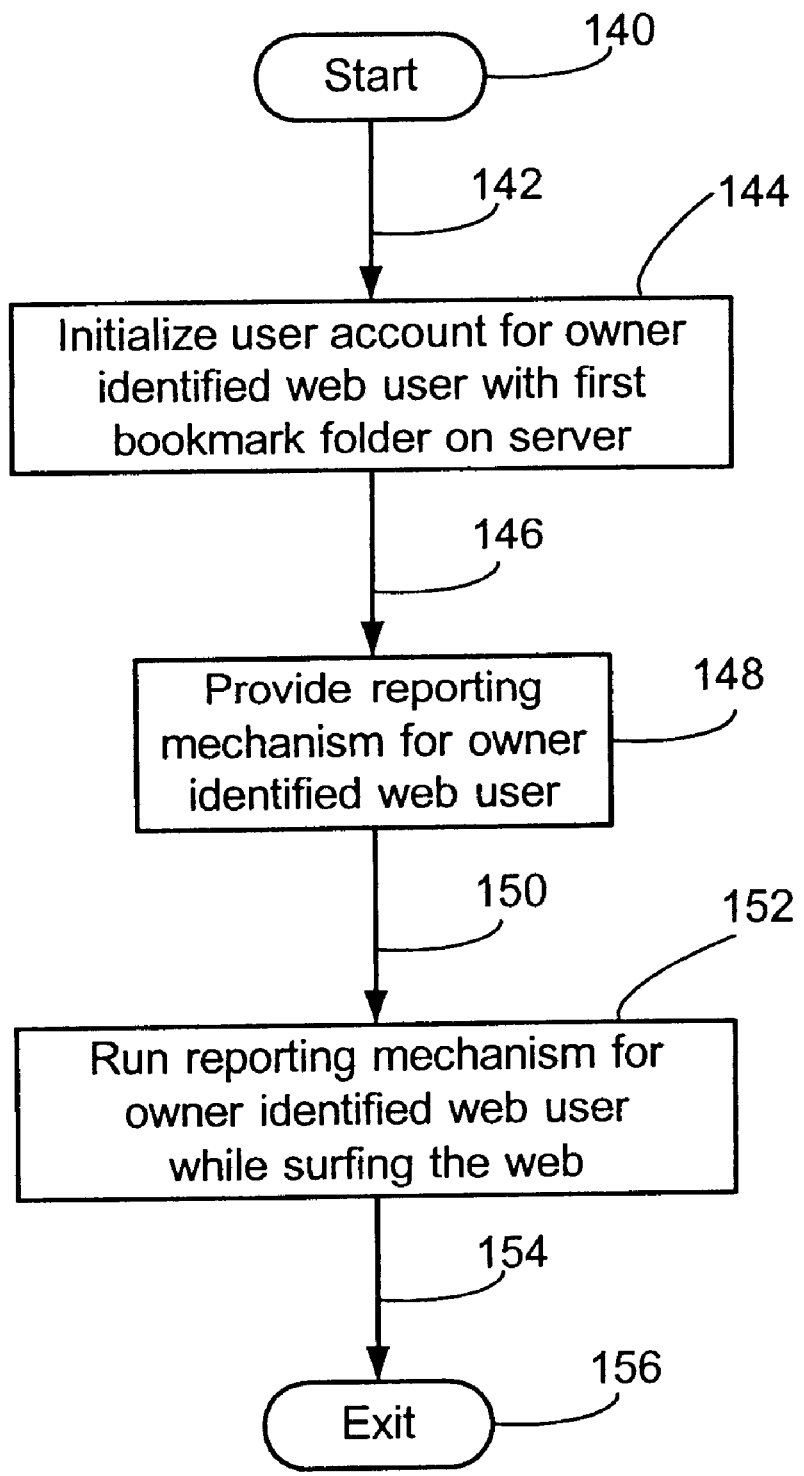
FIG. 5 is a flowchart showing initializing an user account, providing and running the bookmark reporting mechanism in accordance with an embodiment.

FIG. 5 is a flowchart showing initializing an user account, providing and running the bookmark reporting mechanism in accordance with an embodiment. Operation 140 starts this process. In certain embodiments, systems resources are temporarily allocated. Arrow 142 designates the flow of execution from operation 140 to operation 144. Operation 144 initializes a user account for an owner identified web user with a first bookmark folder on a server. Arrow 146 designates the flow of execution from operation 144 to operation 148. Operation 148 provides a reporting mechanism for the owner identified web user. Arrow 150 designates the flow of execution from operation 148 to operation 152. Operation 152 runs the reporting mechanism for the owner identified web user. Arrow 154 designates the flow of execution from operation 152 to operation 156. Operation 156 exits the operations of this flowchart, in certain embodiments releasing systems resources allocated on starting this flowchart.

Figure 6:
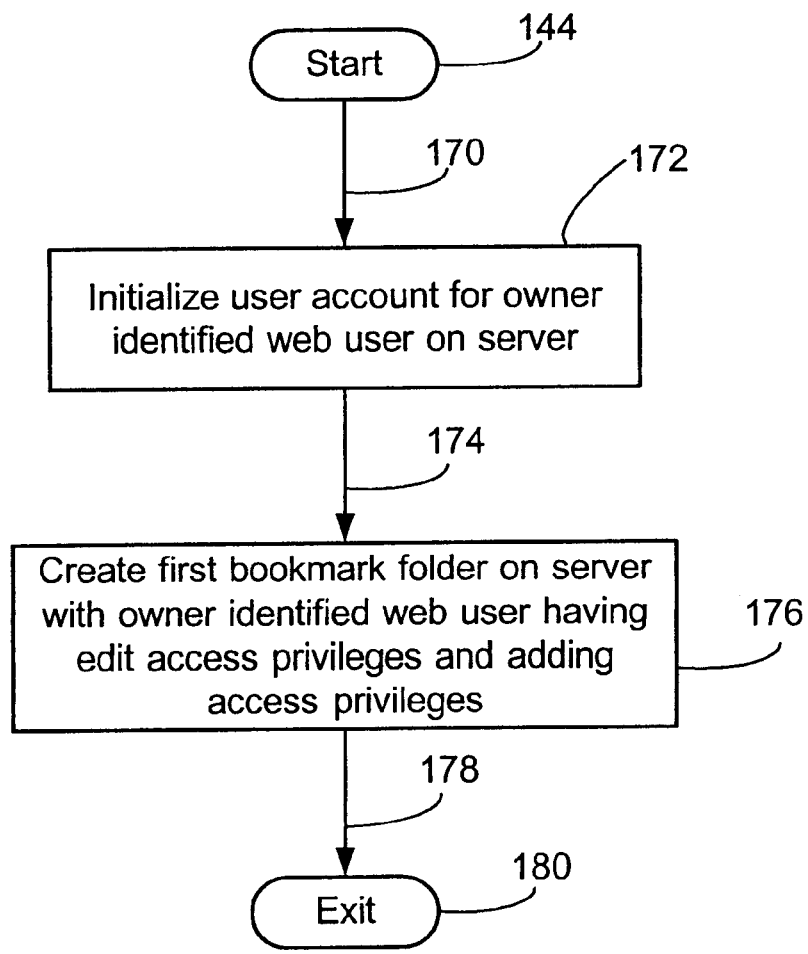
FIG. 6 is a detail flowchart of operation 144, initializing an user account, of the flowchart of FIG. 5 in accordance with an embodiment.

FIG. 6 is a detail flowchart of operation 144, initializing an user account, of the flowchart of FIG. 5 in accordance on server 84 with an embodiment. Operation 144 starts the initialization of a user account for an owner identified web user with a first bookmark folder on a server. In certain embodiments, systems resources are temporarily allocated. Arrow 170 designates the flow of execution from operation 144 to operation 172. Operation 172 initializes the user for the owner identified web user on the server, Arrow 174 designates the flow of execution from operation 172 to operation 176. Operation 176 creates the first bookmark folder on the server with the owner identified web user having edit access privileges and adding access privileges. Arrow 178 designates the flow of execution from operation 176 to operation 180. Operation 180 exits the operations of this flowchart, in certain embodiments releasing systems resources allocated on starting this flowchart.

Figure 7:
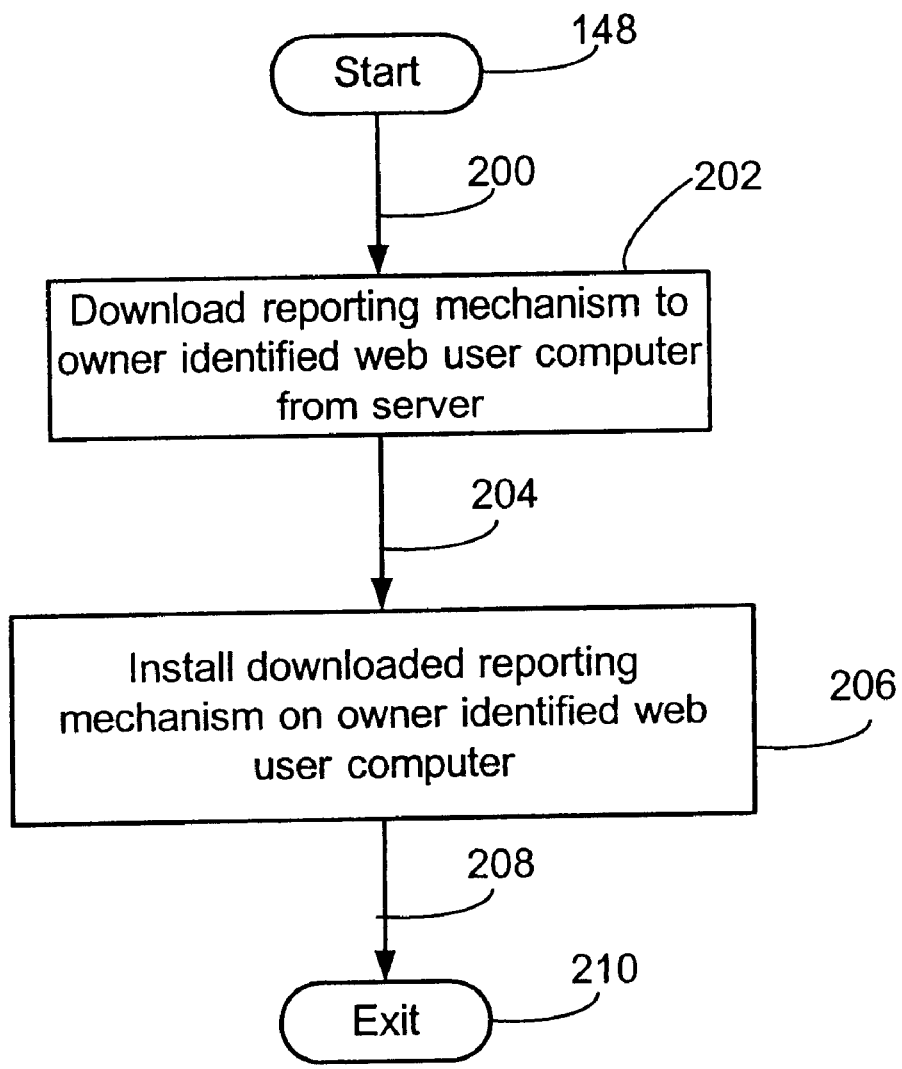
FIG. 7 is a detail flowchart of operation 148, providing a bookmark reporting mechanism, of the flowchart of FIG. 5 in accordance with an embodiment.

FIG. 7 is a detail flowchart of operation 148, providing a bookmark reporting mechanism, of the flowchart of FIG. 5 in accordance with an embodiment. Operation 148 provides a reporting mechanism for the owner identified web user. Starting operation 148 entails allocation of system resources in certain embodiments. Arrow 200 designates the flow of execution from operation 148 to operation 202. Operation 202 downloads a reporting mechanism to owner identified web user computer from server. Arrow 204 designates the flow of execution from operation 202 to operation 206. Operation 206 installs the downloaded reporting mechanism on the owner identified web user computer 72. Arrow 208 designates the flow of execution from operation 206 to operation 210. Operation 210 exits the operations of this flowchart, in certain embodiments releasing systems resources allocated on starting this flowchart.

Figure 8A:
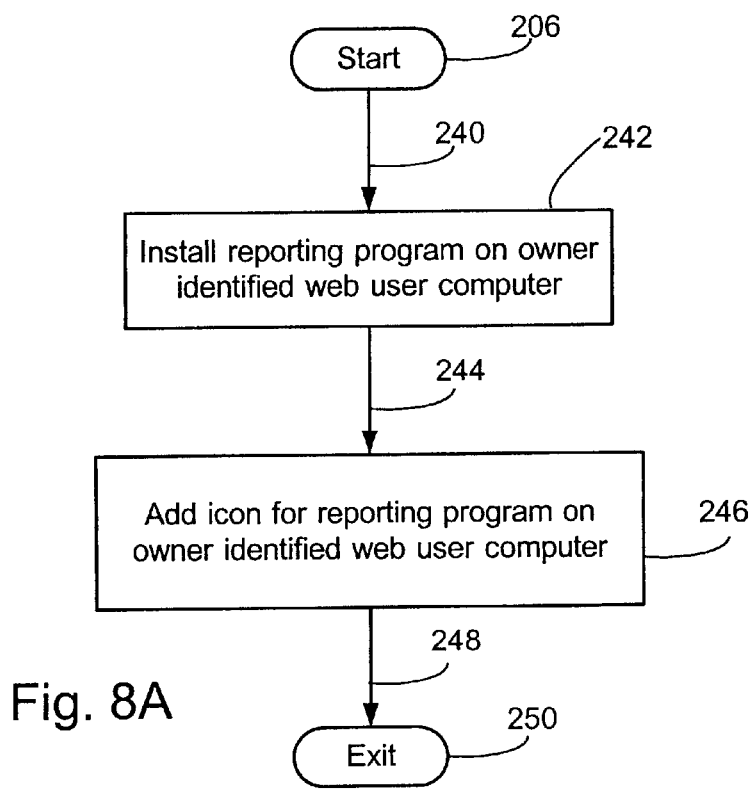
FIG. 8A is a detail flowchart of operation 206, installing the reporting mechanism on the owner identified web user computer, of FIG. 7 in accordance with an embodiment employing icons on the owner identified web user computer.

FIG. 8A is a detail flowchart of operation 206, installing the reporting mechanism on the owner identified web user computer 72, of FIG. 7 in accordance with an embodiment employing icons on the owner identified web user computer 72.

Operation 206 starts by allocating system resources in certain embodiments. Arrow 240 designates the flow of execution from operation 206 to operation 242. Operation 242 installs the reporting program on the owner identified web user computer 72. Arrow 244 designates the flow of execution from operation 242 to operation 246. Operation 246 adds an icon for the installed reporting program on the owner identified web user computer 72. Arrow 248 designates the flow of execution from operation 246 to operation 250. Operation 250 exits the operations of this flowchart, in certain embodiments releasing systems resources allocated on starting this flowchart.

Figure 8B:
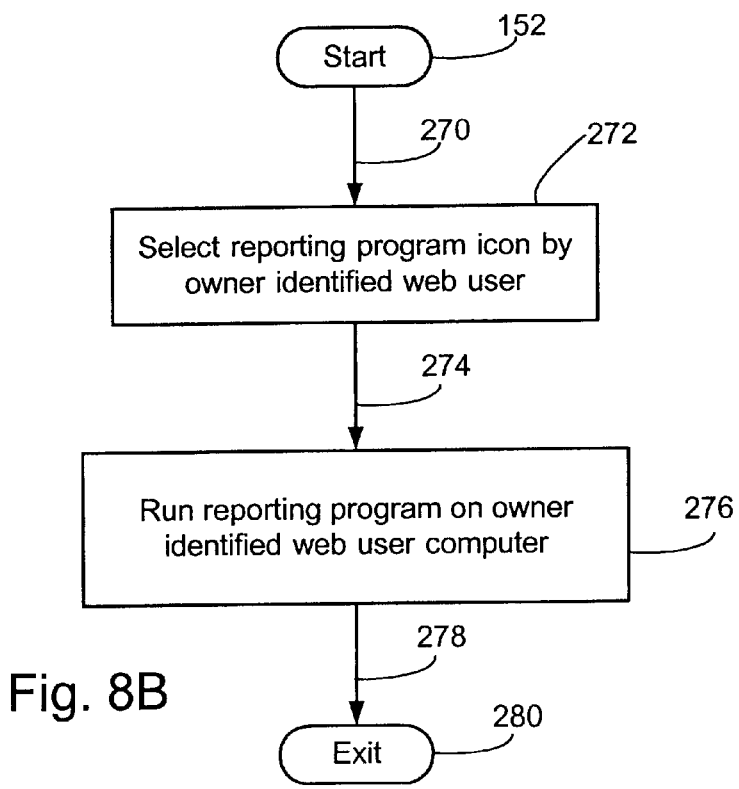
FIG. 8B is a detail flowchart of operation 152, running the reporting mechanism for owner identified web user on owner identified web user's computer, of FIG. 5 in accordance with an embodiment employing icons on the owner identified web user computer.

FIG. 8B is a detail flowchart of operation 152, running the reporting mechanism for owner identified web user on owner identified web user's computer 72, of FIG. 5 in accordance with an embodiment employing icons on the owner identified web user computer.

Operation 152 starts by allocating system resources in certain embodiments. Arrow 270 designates the flow of execution from operation 152. to operation 272. Operation 272 selects the reporting program icon by the owner identified web user on the owner identified web user computer 72. Arrow 274 designates the flow of execution from operation 272 to operation 276.

Operation 276 runs the installed reporting program on the owner identified web user computer 72. Arrow 278 designates the flow of execution from operation 276 to operation 280. Operation 280 exits the operations of this flowchart, in certain embodiments releasing systems resources allocated on starting this flowchart.

Figure 9A:
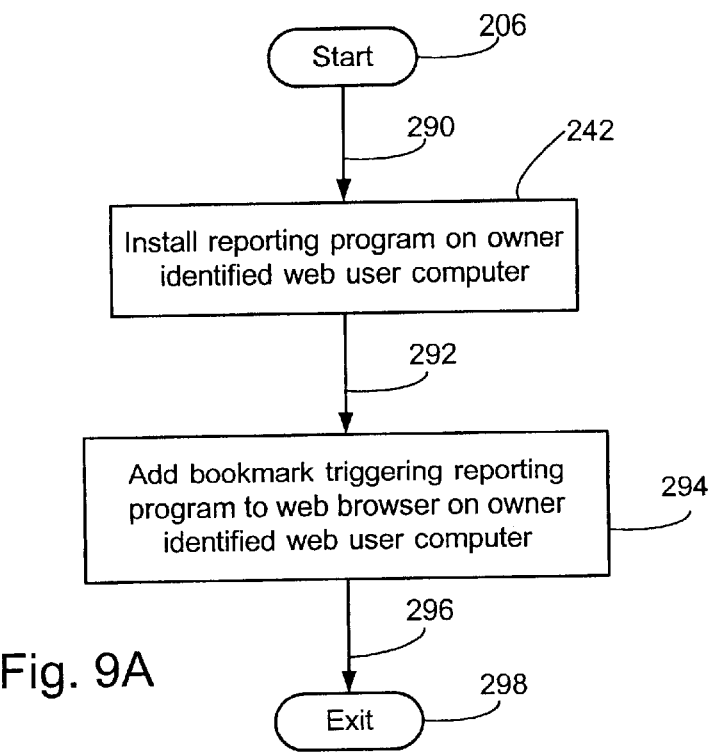
FIG. 9A is a detail flowchart of operation 206, installing the reporting mechanism on the owner identified web user computer, of FIG. 7 in accordance with an embodiment employing a bookmark in the web browser on the owner identified web user computer.

FIG. 9A is a detail flowchart of operation 206, installing the reporting mechanism on the owner identified web user computer, of FIG. 7 in accordance with an embodiment employing a bookmark in the web browser on the owner identified web user computer.

Operation 206 starts by allocating system resources in certain embodiments. Arrow 290 designates the flow of execution from operation 206 to operation 242. Operation 242 installs the reporting program on the owner identified web user computer 72. Arrow 292 designates the flow of execution from operation 242 to operation 294. Operation 294 adds a bookmark in the web browser for triggering the reporting program on the owner identified web user computer 72. Arrow 296 designates the flow of execution from operation 294 to operation 298. Operation 298 exits the operations of this flowchart, in certain embodiments releasing systems resources allocated on starting this flowchart.

Figure 9B:
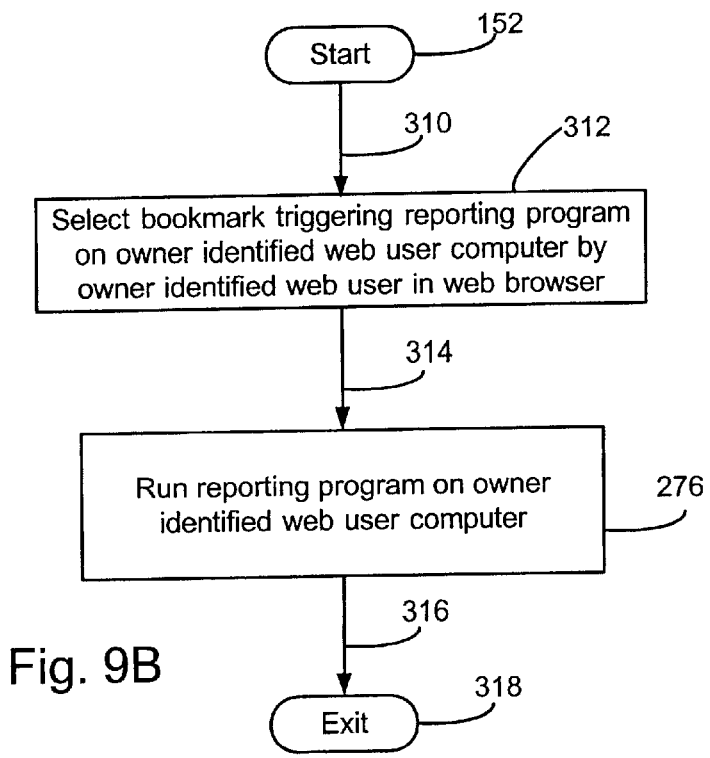
FIG. 9B is a detail flowchart of operation 152, running the reporting mechanism for owner identified web user on owner identified web user's computer, of FIG. 5 in accordance with an embodiment employing a bookmark in the web browser on the owner identified web user computer.

FIG. 9B is a detail flowchart of operation 152, running the reporting mechanism for owner identified web user on owner identified web user's computer, of FIG. 5 in accordance with an embodiment employing a bookmark in the web browser on the owner identified web user computer.

Operation 152 starts by allocating system resources in certain embodiments. Arrow 310 designates the flow of execution from operation 152 to operation 312. Operation 312 selects the bookmark triggering the reporting program by the owner identified web user within the web browser on the owner identified web user computer 72. Arrow 314 designates the flow of execution from operation 312 to operation 276. Operation 276 runs the installed reporting program on the owner identified web user computer 72. Arrow 316 designates the flow of execution from operation 276 to operation 318. Operation 318 exits the operations of this flowchart, in certain embodiments releasing systems resources allocated on starting this flowchart.

Figure 10:
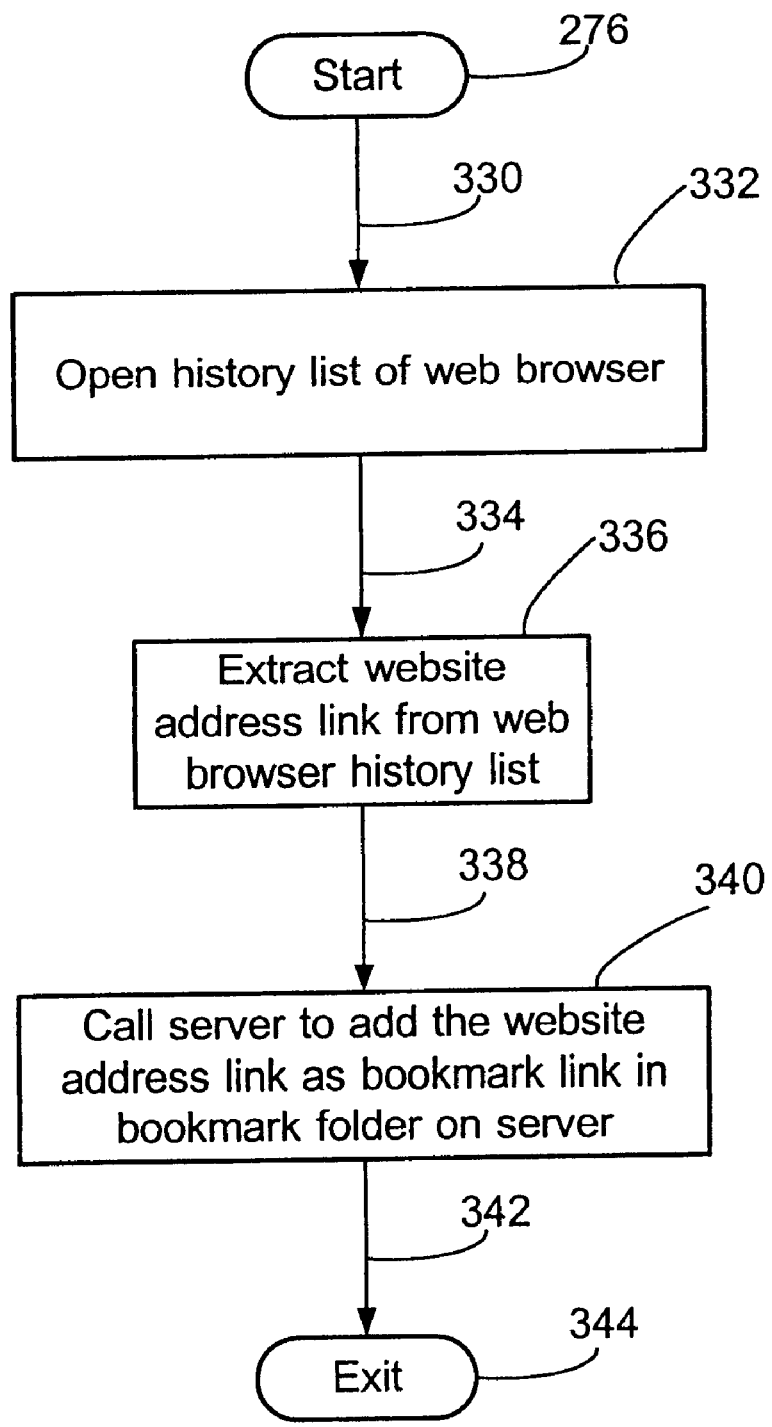
FIG. 10 is a detail flowchart of operation 276, running the reporting program on owner identified web user's computer, of FIG. 8B and 9B in accordance with an embodiment.

FIG. 10 is a detail flowchart of operation 276, running the reporting program on owner identified web user's computer, of FIG. 8B and 9B in accordance with an embodiment.

Operation 276 starts by allocating system resources in certain embodiments. Arrow 330 designates the flow of execution from operation 276 to operation 332. Operation 332 opens the history list of the web browser on the owner identified web user computer 72. Arrow 334 designates the flow of execution from operation 332 to operation 336. Operation 336 extracts the website address link from the web browser history list on the owner identified web user computer 72. Arrow 338 designates the flow of execution from operation 236 to operation 340. Operation 340 calls the server 84 to add the website address link as a bookmark link in the bookmark folder on the server 84. Arrow 342 designates the flow of execution from operation 340 to operation 344.

Operation 344 exits the operations of this flowchart, in certain embodiments releasing systems resources allocated on starting this flowchart.

Figure 11:
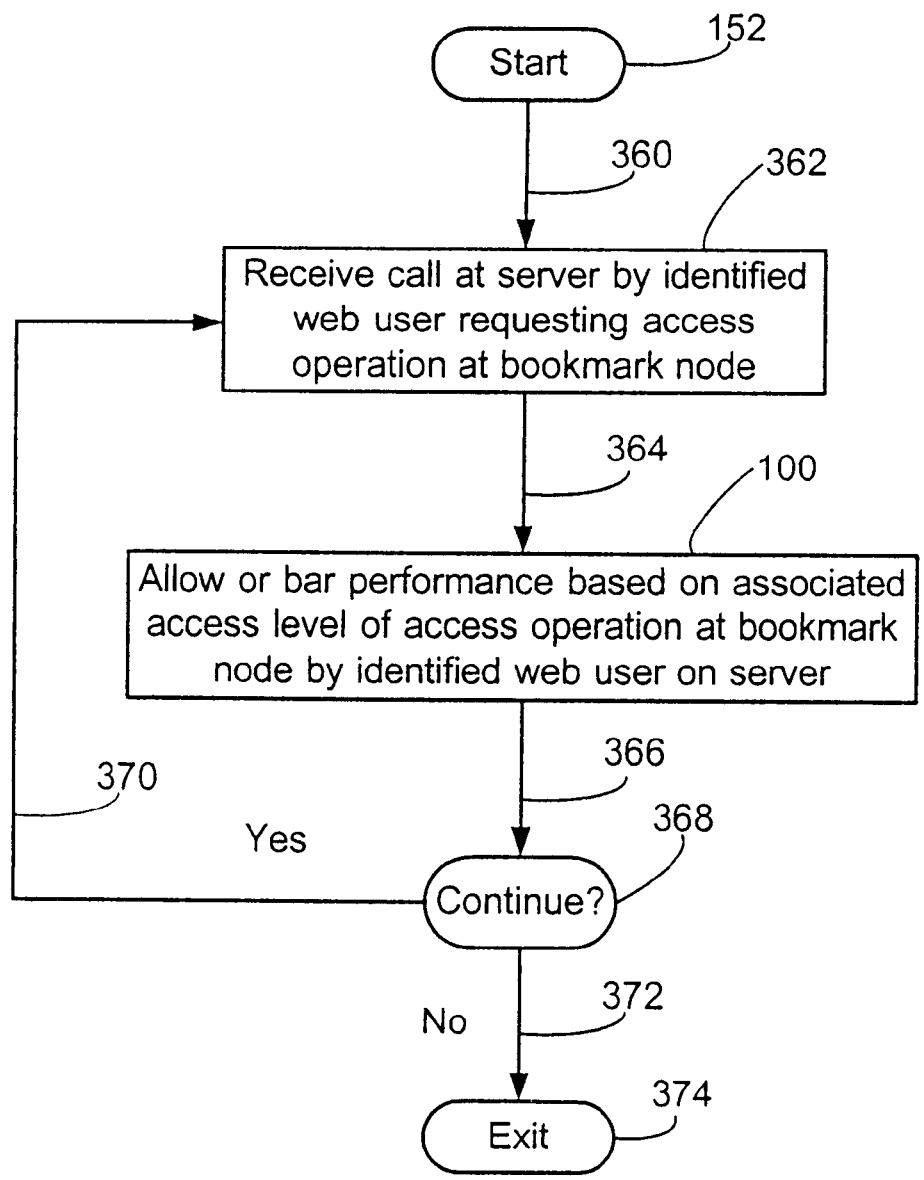
FIG. 11 is a detail flowchart of operation 152, running the reporting mechanism for owner identified web user on the server, of FIG. 5 in accordance with an embodiment.

FIG. 11 is a detail flowchart of operation 152, running the reporting mechanism for owner identified web user on the server, of FIG. 5 in accordance with an embodiment.

Operation 152 starts by allocating system resources in certain embodiments. Arrow 360 designates the flow of execution from operation 152 to operation 362. Operation 362 receives a call at server 84 requesting access operation at the bookmark node by the identified web user. Arrow 364 designates the flow of execution from operation 362 to operation 100. Operation 100 allows or bars the access operation for bookmark node by identified web user on server. Arrow 366 designates the flow of execution from operation 100 to operation 368. Operation 368 determines whether to continue processing calls. If more calls are to be processed, arrow 370 designates the flow of execution from operation 368 to operation 362. If no more calls are to be processed, arrow 372 designates the flow of execution from operation 368 to operation 374. Operation 374 exits the operations of this flowchart, in certain embodiments releasing systems resources allocated on starting this flowchart.

What is claimed is:

1. A method of sharing access operations including viewing and editing of at least one bookmark node with an associated access level for each of said access operations by at least two identified web users, comprising:

retrieving a first of said bookmark nodes from a network server located remotely from said identified web users;

outputting a first of said bookmark nodes to a first of said identified web users;

outputting said first bookmark node to a second of said identified web users;

allowing performance of a first of said access operations of said first of said bookmark nodes by said first of said identified web users whenever said associated access level of said first access operation allows said first identified web user to perform said first access operation upon said first bookmark node;

allowing performance of said first access operation of said first of said bookmark nodes by said second of said identified web users whenever said associated access level of said first access operation allows said second identified web user to perform said first access operation upon said first bookmark node;

barring performance of said first access operation of said first bookmark node by said first identified web user whenever said associated access level of said first access operation bars said first identified web user from performing said first access operation upon said first bookmark node;

barring performance of said first access operation of said first bookmark node by said second identified web user whenever said associated access level of said first access operation bars said second identified web user from performing said first access operation upon said first bookmark node;

recognizing selection of a locally stored bookmark by said first identified web user, wherein the locally stored bookmark is a call to the remote network server;

identifying a web page being viewed by said first identified web user upon recognizing selection of said locally stored bookmark;

calling said remote network server upon recognizing selection of said locally stored bookmark; and adding a link to said identified web page to said first bookmark node stored on said remote network server;

wherein said first identified web user is not required to log on to the server when adding a link to the first bookmark node.

2. A method of sharing access operations including viewing and editing of at least one bookmark node with an associated access level for each of said access operations by at least two identified web users as recited in claim 1 wherein said associated access level of said viewing operation by said first identified web user upon said first bookmark node allows said viewing operation by said first identified web user upon said first bookmark node whenever said associated editing access level of said editing operation by said first identified web user upon said first bookmark node allows performance of said editing operation upon said first bookmark node by said first identified web user.

3. A method of sharing access operations including viewing and editing of at least one bookmark node with an associated access level for each of said access operations by at least two identified web users as recited in claim 1 wherein each of said identified web users is further identified as a public user; and wherein said first bookmark node access level of said first access operation may permit said public user to perform said access operation with said first bookmark node.

4. A method of sharing access operations including viewing and editing of at least one bookmark node with an associated access level for each of said access operations by at least two identified web users as recited in claim 1 wherein said first bookmark node is a bookmark link.

5. A method of sharing access operations including viewing and editing of at least one bookmark node with an associated access level for each of said access operations by at least two identified web users as recited in claim 4 wherein said first bookmark node is a bookmark folder; and wherein said associated access level for each of said access operations by said identified web users of a first bookmark link contained in said first bookmark node folder has by default the same access levels for each of said access operations by said identified web users as for said first bookmark node folder.

6. A method of sharing access operations including viewing and editing of at least one bookmark node with an associated access level for each of said access operations by at least two identified web users as recited in claim 5 wherein said identified web users further contain an identified web user group including at least one of said identified web users wherein said associated access level for a first access operation of said first bookmark node is said identified group access level; and wherein the associated access level for a first identified web user included in a first said identified web user group of said first bookmark node for each of said access operations is the same as the said first identified web user group access level.

7. A method of sharing access operations including viewing and editing of at least one bookmark node with an associated access level for each of said access operations by at least two identified web users as recited in claim 5 wherein said access operations further include adding a bookmark node with an associated access level by at least two identified web users; and further including initializing a user account for an owner of said identified web user with a first bookmark folder on a server wherein said owner identified web user has editing access privileges and adding access privileges of said first bookmark folder on said server;

further including providing a reporting mechanism for said owner identified web user to add a website address link as a bookmark link in said first bookmark folder on said server;

further including running said reporting mechanism for said owner identified web user to add said website address link as said bookmark link in said first bookmark folder on said server; and wherein said owner identified web user triggers said reporting mechanism while operating a web browser by calling said server to add said website address link as said bookmark link in said first bookmark folder on said server.

8. A method of sharing access operations including viewing and editing of at least one bookmark node with an associated access level for each of said access operations by at least two identified web users as recited in claim 7 wherein said providing of said reporting mechanism for said owner identified web user further includes
  downloading of a reporting program to a computer of said owner identified web user; and
  installing of said reporting program on said owner identified web user computer; and
wherein triggering said reporting mechanism by said owner identified web user includes executing said reporting program on said owner identified web user computer which calls said server to add said website address link in said first bookmark folder on said server.

9. A method of sharing access operations including viewing and editing of at least one bookmark node with an associated access level for each of said access operations by at least two identified web users as recited in claim 7
  wherein said providing of said reporting mechanism for said owner identified web user further includes
    downloading of a plug-in to a web browser on a computer of said owner identified web user; and
    installing of said plug-in to said web browser on said computer of said owner identified web user; and
  wherein triggering said reporting mechanism by said owner identified web user includes running said plug-in from said web browser; and
  wherein running said plug-in includes
    opening a history list of said web browser;
    extracting said website address link from said history list of said web browser; and
    calling said server to add said website address link as a bookmark link in said first bookmark folder on said server.

10. A method of sharing access operations including viewing and editing of at least one bookmark node with an associated access level for each of said access operations by at least two identified web users as recited in claim 9
  wherein said installing of said plug-in to said web browser on said computer of said owner identified web user includes adding a trigger bookmark to a local bookmark list of said web browser;
  wherein running said plug-in whenever said owner identified web user selects said trigger bookmark.

11. A method of sharing access operations including viewing and editing of at least one bookmark node with an associated access level for each of said access operations by at least two identified web users as recited in claim 9
  wherein said installing of said plug-in to said web browser on said computer of said owner identified web user includes adding an icon on said owner identified web user computer; and
  wherein running said plug-in whenever said owner identified web user selects said icon.

12. A method of sharing access operations including viewing and editing of at least one bookmark node with an associated access level for each of said access operations by at least two identified web users as recited in claim 1 wherein a reporting mechanism is provided for one of said identified web users to add a website address link as a bookmark link in said first bookmark node;
  wherein said reporting mechanism is run for said one of said identified web users to add said website address link as said bookmark link in said first bookmark node;
  wherein said one of said identified web users triggers said reporting mechanism while operating a web browser by calling said server to add said website address link as said bookmark link in said first bookmark node on said server;
  wherein running said reporting mechanism includes extracting said website address link from said history list of said web browser;
  wherein said reporting mechanism is initiated upon selection by said one of said identified web users of a trigger bookmark.

13. A computer program embodied on a computer readable medium for sharing access operations including viewing and editing of at least one bookmark node with an associated access level for each of said access operations by at least two identified web users including:
  code for retrieving a first of said bookmark nodes from a network server located remotely from said identified web users;
  code for outputting a first of said bookmark nodes to a first of said identified web users;
  code for outputting said first bookmark node to a second of said identified web users;
  code for allowing performance of a first of said access operations of said first of said bookmark nodes by said first of said identified web users whenever said associated access level of said first access operation allows said first identified web user to perform said first access operation upon said first bookmark node;
  code for allowing performance of said first access operation of said first of said bookmark nodes by said second of said identified web users whenever said associated access level of said first access operation allows said second identified web user to perform said first access operation upon said first bookmark node;
  code for barring performance of said first access operation of said first bookmark node by said first identified web user whenever said associated access level of said first access operation bars said first identified web user from performing said first access operation upon said first bookmark node;
  code for barring performance of said first access operation of said first bookmark node by said second identified web user whenever said associated access level of said first access operation bars said second identified web user from performing said first access operation upon said first bookmark node;
  code for recognizing selection of a locally stored bookmark by said first identified web user, wherein the locally stored bookmark is a call to the remote network server;
  code for identifying a web page being viewed by said first identified web user upon recognizing selection of said locally stored bookmark;
  code for calling said remote network server upon recognizing selection of said locally stored bookmark; and
  code for adding a link to said identified web page to said first bookmark node stored on said remote network server;
  wherein said first identified web user is not required to log on to the server when adding a link to the first bookmark node.

14. A computer program embodied on a computer readable medium for sharing access operations including viewing and editing of at least one bookmark node with an associated access level for each of said access operations by at least two identified web users as recited in claim 13
  wherein said associated access level of said viewing operation by said first identified web user upon said first bookmark node allows said viewing operation by said first identified web user upon said first bookmark node whenever said associated editing access level of said editing operation by said first identified web user upon said first bookmark node allows performance of said editing operation upon said first bookmark node by said first identified web user.

15. A computer program embodied on a computer readable medium for sharing access operations including viewing and editing of at least one bookmark node with an associated access level for each of said access operations by at least two identified web users as recited in claim 13 wherein each of said identified web users is further identified as a public user; and wherein said first bookmark node access level of said first access operation may permit said public user to perform said access operation with said first bookmark node.

16. A computer program embodied on a computer readable medium for sharing access operations including viewing and editing of at least one bookmark node with an associated access level for each of said access operations by at least two identified web users as recited in claim 13 wherein said first bookmark node is a bookmark link.

17. A computer program embodied on a computer readable medium for sharing access operations including viewing and editing of at least one bookmark node with an associated access level for each of said access operations by at least two identified web users as recited in claim 16 wherein said first bookmark node is a bookmark folder; and wherein said associated access level for each of said access operations by said identified web users of a first bookmark link contained in said first bookmark node folder has by default the same access levels for each of said access operations by said identified web users as for said first bookmark node folder.

18. A computer program embodied on a computer readable medium for sharing access operations including viewing and editing of at least one bookmark node with an associated access level for each of said access operations by at least two identified web users as recited in claim 17 wherein said identified web users further contain an identified web user group including at least one of said identified web users wherein said associated access level for a first access operation of said first bookmark node is said identified group access level; and wherein the associated access level for a first identified web user included in a first said identified web user group of said first bookmark node for each of said access operations is the same as the said first identified web user group access level.

19. A computer program embodied on a computer readable medium for sharing access operations including viewing and editing of at least one bookmark node with an associated access level for each of said access operations by at least two identified web users as recited in claim 17 wherein said access operations further include adding a bookmark node with an associated access level by at least two identified web users; and further including code initializing a user account for an owner of said identified web user with a first bookmark folder on a server wherein said owner identified web user has editing access privileges and adding access privileges of said first bookmark folder on said server; and further including code providing a reporting mechanism for said owner identified web user to add a website address link as a bookmark link in said first bookmark folder on said server;

further including code running said reporting mechanism for said owner identified web user to add said website address link as said bookmark link in said first bookmark folder on said server; and wherein said owner identified web user triggers running said reporting mechanism code while operating a web browser by calling said server to add said website address link as said bookmark link in said first bookmark folder on said server.

20. A computer program embodied on a computer readable medium for sharing access operations including viewing and editing of at least one bookmark node with an associated access level for each of said access operations by at least two identified web users as recited in claim 19 wherein said providing of said reporting mechanism for said owner identified web user further includes code downloading a reporting program to a computer of said owner identified web user; and code installing said reporting program on said owner identified web user computer; and wherein code triggering said reporting mechanism by said owner identified web user includes code executing said reporting program on said owner identified web user computer which calls said server to add said website address link in said first bookmark folder on said server from said owner identified web user computer.

21. A computer program embodied on a computer readable medium for sharing access operations including viewing and editing of at least one bookmark node with an associated access level for each of said access operations by at least two identified web users as recited in claim 19 wherein said providing of said reporting mechanism for said owner identified web user further includes code downloading a plug-in computer program to a web browser on a computer of said owner identified web user; and code installing said plug-in computer program to said web browser on said owner identified web user computer; and wherein code triggering said reporting mechanism by said owner identified web user includes running said plug-in from said web browser on said owner identified web user computer; and wherein code running said plug-in includes code for opening a history list of said web browser;

code for extracting said website address link from said history list of said web browser; and code for calling said server to add said website address link as a bookmark link in said first bookmark folder on said server.

22. A computer program embodied on a computer readable medium for sharing access operations including viewing and editing of at least one bookmark node with an associated access level for each of said access operations by at least two identified web users as recited in claim 21 wherein said code installing said plug-in computer program to said web browser on said owner identified web user computer includes code adding a trigger bookmark to a local bookmark list of said web browser;

wherein running said plug-in computer program on said owner identified web user computer whenever said owner identified web user selects said trigger bookmark.

23. A computer program embodied on a computer readable medium for sharing access operations including viewing and editing of at least one bookmark node with an associated access level for each of said access operations by at least two identified web users as recited in claim 21 wherein said code installing said plug-in to said web browser on said owner identified web user computer includes code adding an icon on said owner identified web user computer;

wherein running said plug-in computer program which calls said server to add said website address link to said first bookmark folder on said server whenever said owner identified web user selects said icon; and wherein running said plug-in includes
code opening a history list of said web browser; and
code extracting said website address link from said history list of said web browser.

24. A computer network for sharing access operations including viewing and editing of at least one bookmark node with an associated access level for each of said access operations by at least two identified web users including:

at least one server coupled via said computer network with at least one client computer operated by said identified web users;

wherein said server contains a computer program for sharing said access operations of at least one bookmark node with an associated access level for each of said access operations by said identified web users;

wherein said access operations of said bookmark node by said identified web uses are initiated by requests for access operations by said identified web users from said client computers;

wherein said server contains a computer program for retrieving a first of said bookmark nodes from a network server located remotely from said identified web users;

wherein said server contains a computer program for outputting a first of said bookmark nodes to a first of said identified web users;

wherein said server contains a computer program for outputting said first bookmark node to a second of said identified web users;

wherein said server allows the performance of a first of said access operations of said first of said bookmark nodes by said first of said identified web users whenever said associated access level of said first access operation allows said first identified web user to perform said first access operation upon said first bookmark node;

wherein said server allows the performance of said first access operation of said first of said bookmark nodes by said second of said identified web users whenever said associated access level of said first access operation allows said second identified web user to perform said first access operation upon said first bookmark node;

wherein said server bars performance of said first access operation of said first bookmark node by said first identified web user whenever said associated access level of said first access operation bars said first identified web user from performing said first access operation upon said first bookmark node;

wherein said server bars performance of said first access operation of said first bookmark node by said second identified web user whenever said associated access level of said first access operation bars said second identified web user from performing said first access operation upon said first bookmark node;

wherein said server contains a computer program for recognizing selection of a locally stored bookmark by said first identified web user, wherein the locally stored bookmark is a call to the remote network server;

wherein said server contains a computer program for identifying a web page being viewed by said first identified web user upon recognizing selection of said locally stored bookmark;

wherein said server contains a computer program for calling said remote network server upon recognizing selection of said locally stored bookmark;

wherein said server contains a computer program for adding a link to said identified web page to said first bookmark node stored on said remote network server;

wherein said first identified web user is not required to log on to the server when adding a link to the first bookmark node.

25. A computer network for sharing access operations for sharing access operations including viewing and editing of at least one bookmark node with an associated access level for each of said access operations by at least two identified web users as recited in claim 24 wherein said associated access level of said viewing operation by said first identified web user upon said first bookmark node allows said viewing operation by said first identified web user upon said first bookmark node whenever said associated editing access level of said editing operation by said first identified web user upon said first bookmark node allows performance of said editing operation upon said first bookmark node by said first identified web user.

26. A computer network for sharing access operations for sharing access operations including viewing and editing of at least one bookmark node with an associated access level for each of said access operations by at least two identified web users as recited in claim 24 wherein each of said identified web users is further identified as a public user; and wherein said first bookmark node access level of said first access operation may permit said public user to perform said access operation with said first bookmark node.

27. A computer network for sharing access operations for sharing access operations including viewing and editing of at least one bookmark node with an associated access level for each of said access operations by at least two identified web users as recited in claim 24 wherein said first bookmark node is a bookmark link on said server.

28. A computer network for sharing access operations for sharing access operations including viewing and editing of at least one bookmark node with an associated access level for each of said access operations by at least two identified web users as recited in claim 27 wherein said first bookmark node is a bookmark folder on said server; and wherein said associated access level for each of said access operations by said identified web users of a first bookmark link contained in said first bookmark node folder has by default the same access levels for each of said access operations by said identified web users as for said first bookmark node folder.

29. A computer network for sharing access operations for sharing access operations including viewing and editing of at least one bookmark node with an associated access level for each of said access operations by at least two identified web users as recited in claim 28
    wherein said identified web users further contain an identified web user group including at least one of said identified web users wherein said associated access level for a first access operation of said first bookmark node is said identified group access level; and
    wherein the associated access level for a first identified web user included in a first said identified web user group of said first bookmark node for each of said access operations is the same as the said first identified web user group access level.

30. A computer network for sharing access operations for sharing access operations including viewing and editing of at least one bookmark node with an associated access level for each of said access operations by at least two identified web users as recited in claim 28
    wherein said access operations further include adding a bookmark node with an associated access level by at least two identified web users on said server; and
    further including code initializing a user account for an owner of said identified web user with a first bookmark folder on said server wherein said owner identified web user has editing access privileges and adding access privileges of said first bookmark folder on said server; and
    further including code providing a reporting mechanism for said owner identified web user to add a website address link as a bookmark link in said first bookmark folder on said server;
    further including code running said reporting mechanism for said owner identified web user to add said website address link as said bookmark link in said first bookmark folder on said server; and
    wherein said owner identified web user triggers said reporting mechanism code while operating a web browser by calling said server to add said website address link as said bookmark link in said first bookmark folder on said server.

31. A computer network for sharing access operations for sharing access operations including viewing and editing of at least one bookmark node with an associated access level for each of said access operations by at least two identified web users as recited in claim 30
    wherein said providing of said reporting mechanism for said owner identified web user further includes
        code for downloading a reporting program to a first of said client computers of said owner identified web user; and
        code for installing said reporting program on said first client computer of said owner identified web user; and
    wherein code triggering said reporting mechanism by said owner identified web user includes code executing said reporting program on said owner identified web user computer which calls said server to add said website address link in said first bookmark folder on said server.

32. A computer network for sharing access operations for sharing access operations including viewing and editing of at least one bookmark node with an associated access level for each of said access operations by at least two identified web users as recited in claim 30
    wherein said providing of said reporting mechanism for said owner identified web user further includes
        code for downloading a plug-in to a web browser on said first client computer of said owner identified web user; and
        code for installing said web browser plug-in on said first client computer of said owner identified web user; and
    wherein code triggering said reporting mechanism by said owner identified web user includes running said plug-in from said web browser on said first client computer; and
    wherein running said plug-in on said first client computer includes
        code for opening a history list of said web browser on said first client computer;
        code for extracting said website address link from said history list of said web browser on said first client computer; and
        code for calling said server to add said website address link as a bookmark link in said first bookmark folder on said server.

33. A computer network for sharing access operations for sharing access operations including viewing and editing of at least one bookmark node with an associated access level for each of said access operations by at least two identified web users as recited in claim 32
    wherein said code installing of said plug-in to said web browser on said first client computer of said owner identified web user includes adding a trigger bookmark to a local bookmark list of said web browser;
    wherein running said plug-in on said first client computer whenever said owner identified web user selects said trigger bookmark on said first client computer.

34. A computer network for sharing access operations for sharing access operations including viewing and editing of at least one bookmark node with an associated access level for each of said access operations by at least two identified web users as recited in claim 32
    wherein said code installing said plug-in to said web browser on said first client computer of said owner identified web user includes code adding an icon on said owner identified web user computer;
    wherein running said plug-in which calls said server to add said website address link to said first bookmark folder on said server whenever said owner identified web user selects said icon; and
    wherein running said plug-in includes
        code opening a history list of said web browser; and
        code extracting said website address link from said history list of said web browser.

35. A computer network for sharing access operations for sharing access operations including viewing and editing of at least one bookmark node with an associated access level for each of said access operations by at least two identified web users as recited in claim 30
    further including an account server coupled to said server via said network and coupled to said web users via said network;
    said account server includes a local mass storage containing
        said code installing said plug-in to said web browser; and
        said program initializing said user account resides on said account server local mass storage.

36. A method of sharing access operations including viewing and editing of at least one bookmark node with an associated access level for each of said access operations by at least two identified web users including steps of:
    retrieving a first of said bookmark nodes from a network server located remotely from said identified web users;

outputting said first of said bookmark nodes to a first of said identified web users;

outputting said first bookmark node to a second of said identified web users;

allowing performance of a first of said access operations of said first of said bookmark nodes by said first of said identified web users whenever said associated access level of said first access operation allows said first identified web user to perform said first access operation upon said first bookmark node;

allowing performance of said first access operation of said first of said bookmark nodes by said second of said identified web users whenever said associated access level of said first access operation allows said second identified web user to perform said first access operation upon said first bookmark node;

barring performance of said first access operation of said first bookmark node by said first identified web user whenever said associated access level of said first access operation bars said first identified web user from performing said first access operation upon said first bookmark node;

barring performance of said first access operation of said first bookmark node by said second identified web user whenever said associated access level of said first access operation bars said second identified web user from performing said first access operation upon said first bookmark node;

allowing performance of a second of said access operations of said first of said bookmark nodes by said first of said identified web users whenever said associated access level of said second access operation allows said first identified web user to perform said second access operation upon said first bookmark node;

allowing performance of said second access operation of said first of said bookmark nodes by said second of said identified web users whenever said associated access level of said second access operation allows said second identified web user to perform said second access operation upon said first bookmark node;

barring performance of said second access operation of said first bookmark node by said first identified web user whenever said associated access level of said second access operation bars said first identified web user from performing said second access operation upon said first bookmark node;

barring performance of said second access operation of said first bookmark node by said second identified web user whenever said associated access level of said second access operation bars said second identified web user from performing said second access operation upon said first bookmark node;

wherein at least one of said access operations is for editing the bookmark node;

recognizing selection of a locally stored bookmark by said first identified web user, wherein selection of said locally stored bookmark calls said remote network server;

identifying a web page being viewed by said first identified web user upon recognizing said selection of said locally stored bookmark;

adding a link to said identified web page to said first bookmark node stored on said remote network server;

initiating a reporting mechanism installed locally;

wherein said associated access level of said viewing operation by said first identified web user upon said first bookmark node allows said viewing operation by said first identified web user upon said first bookmark node whenever said associated editing access level of said editing operation by said first identified web user upon said first bookmark node allows performance of said editing operation upon said first bookmark node by said first identified web user;

wherein each of said identified web users is further identified as a public user;

wherein said first bookmark node access level of said first access operation may permit said public user to perform said access operation with said first bookmark node;

wherein said first bookmark node is a bookmark folder; wherein said associated access level for each of said access operations by said identified web users of a first bookmark link contained in said first bookmark node folder has by default the same access levels for each of said access operations by said identified web users as for said first bookmark node folder;

wherein said identified web users further contain an identified web user group including at least one of said identified web users wherein said associated access level for a first access operation of said first bookmark node is said identified group access level;

wherein the associated access level for a first identified web user included in a first said identified web user group of said first bookmark node for each of said access operations is the same as the said first identified web user group access level;

wherein said access operations further include adding a bookmark node with an associated access level by at least two identified web users;

initializing a user account for an owner of said identified web user with a first bookmark folder on a server wherein said owner identified web user has editing access privileges and adding access privileges of said first bookmark folder on said server;

providing a reporting mechanism for said owner identified web user to add a website address link as a bookmark link in said first bookmark folder on said server;

running said reporting mechanism for said owner identified web user to add said website address link as said bookmark link in said first bookmark folder on said server;

wherein said owner identified web user triggers said reporting mechanism while operating a web browser by calling said server to add said website address link as said bookmark link in said first bookmark folder on said server;

wherein said providing of said reporting mechanism for said owner identified web user further includes downloading of a reporting program to a computer of said owner identified web user;

installing of said reporting program on said owner identified web user computer;

wherein triggering said reporting mechanism by said owner identified web user includes executing said reporting program on said owner identified web user computer which calls said server to add said web site address link in said first bookmark folder on said server;

wherein said providing of said reporting mechanism for said owner identified web user further includes downloading of a plug-in to a web browser on a computer of said owner identified web user;

installing of said plug-in to said web browser on said computer of said owner identified web user;

wherein triggering said reporting mechanism by said owner identified web user includes running said plug-in from said web browser;

wherein running said plug-in includes opening a history list of said web browser;

extracting said website address link from said history list of said web browser;

calling said server to add said website address link as a bookmark link in said first bookmark folder on said server;

wherein said installing of said plug-in to said web browser on said computer of said owner identified web user includes adding a trigger bookmark to a local bookmark list of said web browser;

wherein running said plug-in whenever said owner identified web user selects said trigger bookmark;

wherein said installing of said plug-in to said web browser on said computer of said owner identified web user includes adding an icon on said owner identified web user computer; and wherein running said plug-in whenever said owner identified web user selects said icon.

* * * * *